(12) United States Patent
Knoll, Jr. et al.

(10) Patent No.: US 11,247,519 B2
(45) Date of Patent: Feb. 15, 2022

(54) SECONDARY CONTAINMENT DEVICE FOR TOWING TRUCK

(71) Applicant: Richard David Hawk, Lancaster, NY (US)

(72) Inventors: Daniel A. Knoll, Jr., Amherst, NY (US); David Richard Hawk, Lancaster, NY (US)

( * ) Notice: Subject to any disclaimer, the term of this patent is extended or adjusted under 35 U.S.C. 154(b) by 439 days.

(21) Appl. No.: 16/515,266

(22) Filed: Jul. 18, 2019

(65) Prior Publication Data

US 2021/0016617 A1 Jan. 21, 2021

(51) Int. Cl.
*B60D 1/28* (2006.01)
*B65H 59/04* (2006.01)
*B60P 3/073* (2006.01)

(52) U.S. Cl.
CPC .............. *B60D 1/28* (2013.01); *B65H 59/04* (2013.01); *B60P 3/073* (2013.01)

(58) Field of Classification Search
CPC .. B60D 1/185; B60D 1/28; B60D 1/18; B60P 3/125; B60P 3/073; B65H 59/04
See application file for complete search history.

(56) References Cited

U.S. PATENT DOCUMENTS

| | | | | |
|---|---|---|---|---|
| 453,073 A * | 5/1891 | Biederman | ............ | B65H 59/04 242/156.2 |
| 2,777,643 A * | 1/1957 | Bancroft | ................ | B65H 59/04 242/421.9 |
| 2,877,620 A * | 3/1959 | Blaisdell | .................. | D07B 7/06 57/58.34 |
| 3,322,396 A | 5/1967 | Hubbard | | |
| 3,468,557 A | 9/1969 | Ferrier | | |
| 3,581,586 A * | 6/1971 | Blackburn | ............... | B66D 1/06 74/159 |
| 3,659,874 A | 5/1972 | Rendessy | | |
| 3,724,875 A * | 4/1973 | Hillman | .................. | B60D 1/38 280/457 |
| 3,770,149 A * | 11/1973 | Aquila | .................... | B60P 3/125 414/563 |
| 3,881,751 A * | 5/1975 | Colby | .................... | B60D 1/185 280/480 |
| 4,840,534 A | 6/1989 | Totty | | |
| 4,958,980 A | 9/1990 | Holmes et al. | | |
| 5,039,272 A * | 8/1991 | Holmes | .................. | B60P 3/125 414/563 |
| 5,350,186 A * | 9/1994 | Hull | ...................... | B60D 1/185 242/379.2 |
| 5,476,280 A * | 12/1995 | MacMullan | ........... | B60D 1/185 242/379.2 |

(Continued)

FOREIGN PATENT DOCUMENTS

DE 1755474 11/1971
FR 2325594 4/1977

*Primary Examiner* — Michael E Gallion
(74) *Attorney, Agent, or Firm* — Simpson & Simpson, PLLC; Michael Nicholas Vranjes

(57) ABSTRACT

A containment device, including a housing, a first axle rotatably connected to the housing, the first axle including at least one gear having a plurality of teeth, a second axle rotatably connected to the housing, the second axle including at least one pawl operatively arranged to engage the plurality of teeth, and a line connected to the first axle and engaged with the second axle.

20 Claims, 7 Drawing Sheets

(56) References Cited

U.S. PATENT DOCUMENTS

| | | | |
|---|---|---|---|
| 5,967,539 A * | 10/1999 | Digman | B60D 1/28 |
| | | | 280/480 |
| 6,572,132 B1 | 6/2003 | Saul | |
| 6,752,412 B2 * | 6/2004 | Saul | B60D 1/18 |
| | | | 280/457 |
| 7,963,543 B2 * | 6/2011 | Green | B60D 1/18 |
| | | | 280/457 |
| 2009/0250543 A1 * | 10/2009 | Bond | B66D 1/04 |
| | | | 242/413 |
| 2010/0207355 A1 * | 8/2010 | Wang | B60P 3/125 |
| | | | 280/402 |
| 2011/0150613 A1 | 6/2011 | Hwang | |
| 2014/0048758 A1 * | 2/2014 | Oland | E04H 17/266 |
| | | | 254/217 |

* cited by examiner

SECONDARY CONTAINMENT DEVICE FOR TOWING TRUCK

FIELD

The present disclosure relates to containment devices for towing vehicles, and more particularly to a secondary containment device for a tow vehicle.

BACKGROUND

Towing is coupling two or more objects together so that they may be pulled by a designated power source or sources. The towing source may be a motorized land vehicle, vessel, animal, or human, the load anything that can be pulled. These may be joined by a chain, rope, bar, hitch, three-point, fifth wheel, coupling, drawbar, integrated platform, or other means of keeping the objects together while in motion.

Towing may be as simple as a tractor pulling a tree stump. The most familiar form is the transport of disabled or otherwise indisposed vehicles by a tow truck or "wrecker." Other familiar forms are the tractor-trailer combination, and cargo or leisure vehicles coupled via ball or pintle and gudgeon trailer-hitches to smaller trucks and cars. In the opposite extreme are extremely heavy duty tank recovery vehicles, and enormous ballast tractors involved in heavy hauling towing loads stretching into the millions of pounds.

Necessarily, government and industry standards have been developed for carriers, lighting, and coupling to ensure safety and interoperability of towing equipment. However, when a tow truck, for example a flatbed tow truck, is pulling a broken down vehicle up onto the inclined flatbed, there is a danger of the main winch or main cable breaking, or the connection of the main cable to the broken down vehicle may break (either on the vehicle or the main cable connector). This can have potentially catastrophic consequences as the broken down, partial towed, vehicle may fall back down the inclined flatbed and hurt someone or damage property.

Thus, there is a long-felt need for a secondary containment device that acts as a catch in case of a main winch failure to prevent injury and/or damage of property.

SUMMARY

According to aspects illustrated herein, there is provided a containment device, comprising a housing, a first axle rotatably connected to the housing, the first axle including at least one gear having a plurality of teeth, a second axle rotatably connected to the housing, the second axle including at least one pawl operatively arranged to engage the plurality of teeth, and a line connected to the first axle and engaged with the second axle.

According to aspects illustrated herein, there is provided a containment device, comprising a housing, a first axle rotatably connected to the housing, the first axle including at least one gear having a plurality of teeth, a second axle rotatably connected to the housing, the second axle including at least one pawl operatively arranged to engage the plurality of teeth, a first tensioner connected to the second axle, the first tensioner biasing the second axle in a first circumferential direction, and a line connected to the first axle and engaged with the second axle.

According to aspects illustrated herein, there is provided a containment device, comprising a housing, a first axle rotatably connected to the housing, the first axle including at least one gear, a second axle rotatably connected to the housing, the second axle including at least one pawl operatively arranged to engage the at least one gear, a first tensioner connected to the first axle, the first tensioner biasing the first axle in a first circumferential direction, a second tensioner connected to the second axle, the second tensioner biasing the second axle in a second circumferential direction, opposite the first circumferential direction, and a line connected to the first axle and engaged with the second axle, wherein when an engagement force is applied to the line, the at least one pawl displaces in the first circumferential direction, engages the at least one gear, and prevents displacement of the first axle in the second circumferential direction.

The present disclosure comprises a safety or secondary containment device used to prevent a vehicle from runaway free rolling off an inclined bed of a flatbed tow truck, in the event of a winch cable breaking. The safety device is completely self-contained, weatherproof, and requires very little maintenance. The safety device can be self-tested every time it is used by applying a quick pull and hold on the line. The safety device is attached to the truck bed next to the main winch. In some embodiments, the line or synthetic cable is attached to the main cable hook and is pulled out and rewound automatically with the main cable. If the main cable breaks the safety device will lock up the secondary line/cable preventing a roll-away vehicle.

In a disengaged position, the line will be pulled out along with the main cable (i.e., winching out) and rewound on the first axle (i.e., winching in) using the constant force spring to turn the first axle. When the main cable breaks, either winching in or winching out, the line will pull on the bar of the second axle overcoming the tensioning spring placing the pawls in the engaged position. In the engaged position, the pawls of the second axle engage the gears of the first axle to lock up the first axle. The pawls will remain in the engaged position until the force on the line is released, at which point the tensioning spring will displace the pawls back to the disengaged position.

The two pawls and lever are on a common keyed shaft (i.e., the second axle). The two gears are attached to the ends of the first axle. The bar is attached to the two pawls. The first axle may further comprise drum guide plates. In some embodiments, the safety device uses a 35 foot line that can be rewound using a standard constant force spring. In some embodiments, the safety device is completely enclosed with sheet metal or another material except at the opening proximate the guides. The safety device may further comprise a weatherproof cover with access to adjust the tensioning spring.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
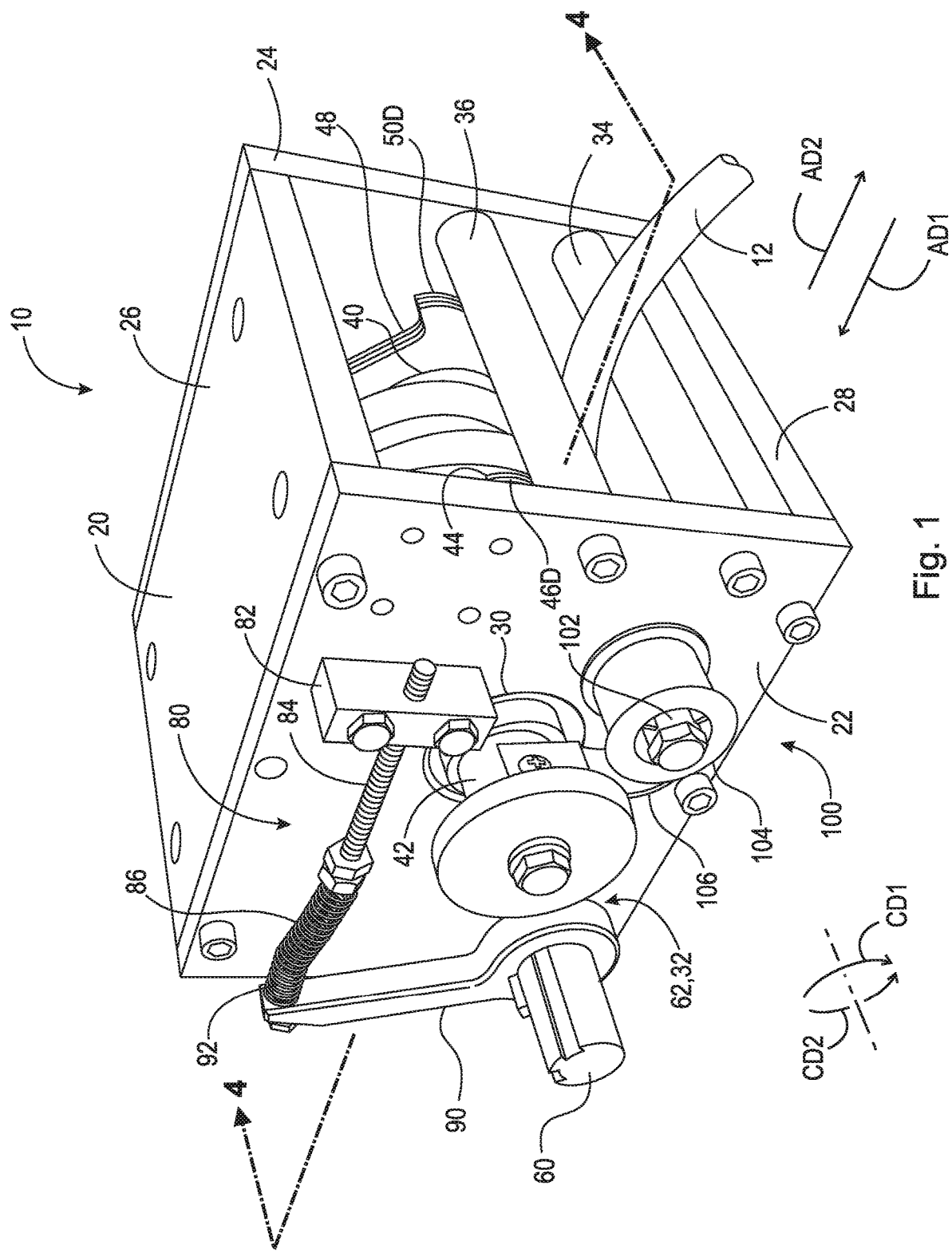
FIG. 1 is a front perspective view of a containment device, in a disengaged state.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required. By "rotatably connected" elements, we mean that the elements are rotatable with respect to each other.

Figure 2:
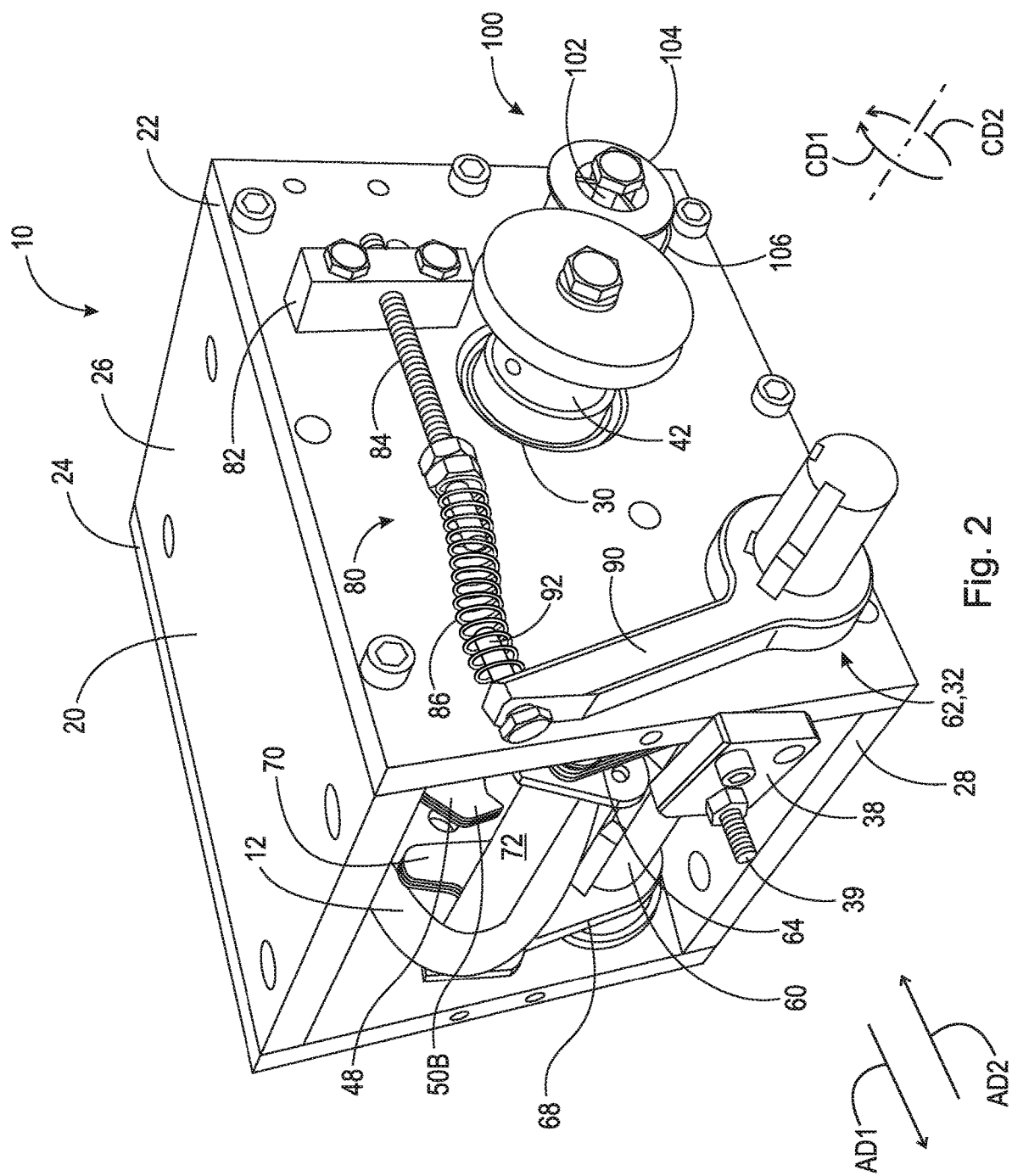
FIG. 2 is a rear perspective view of the containment device shown in FIG. 1.
Figure 3A:
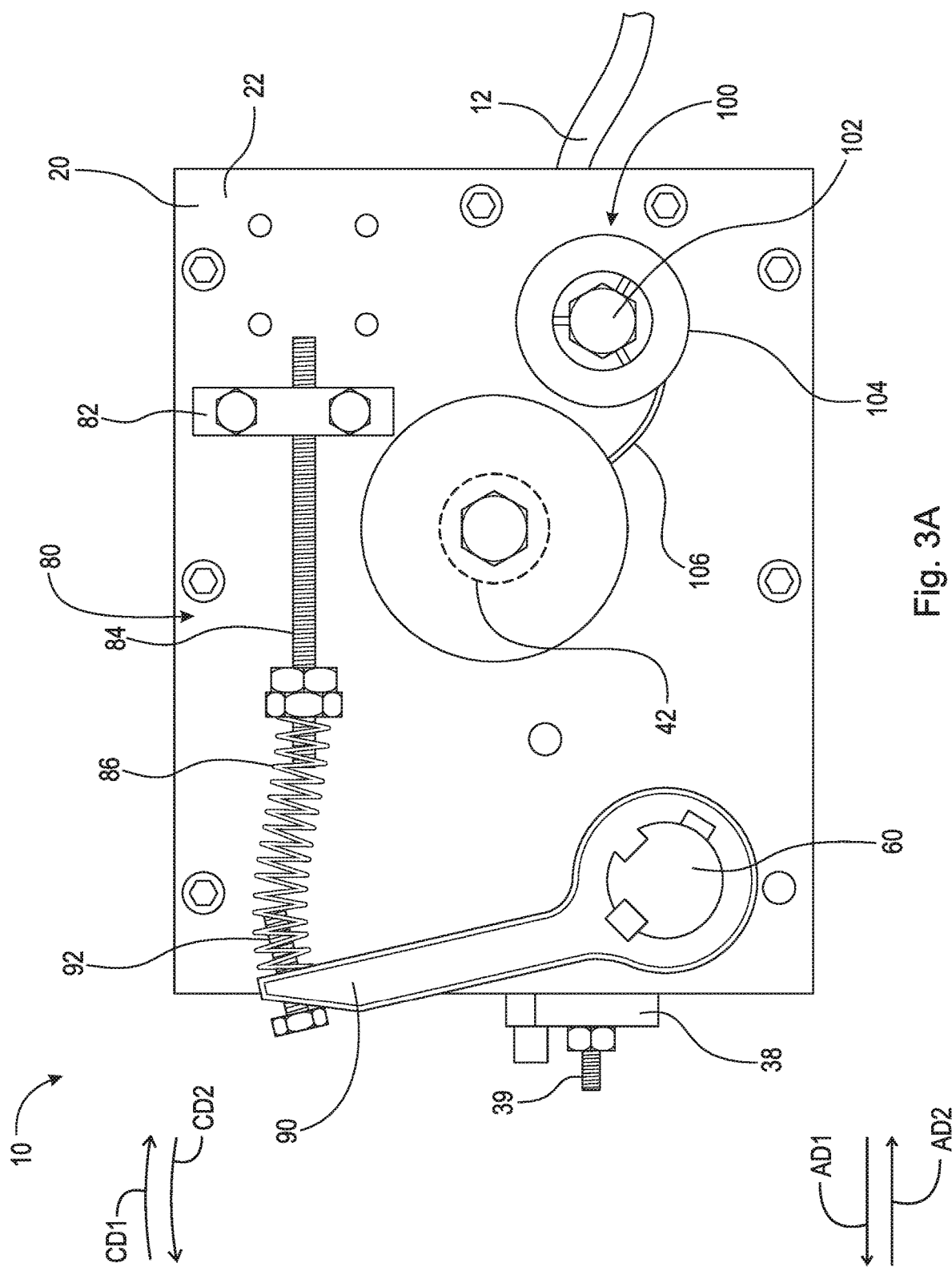
FIG. 3A is a side elevational view of the containment device shown in FIG. 1.
Figure 3B:
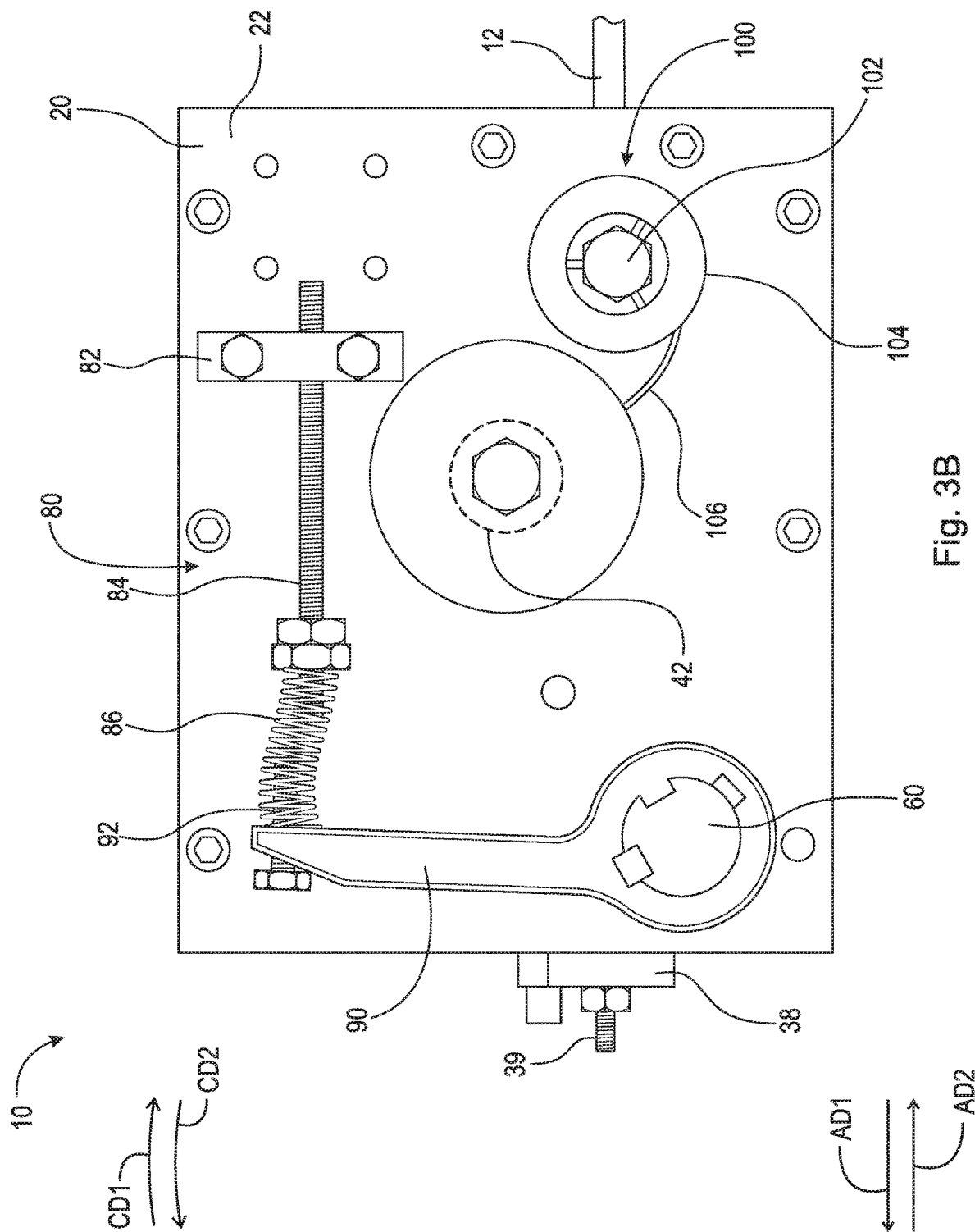
FIG. 3B is a side elevational view of the containment device shown in FIG. 1, in an engaged state.
Figure 4A:
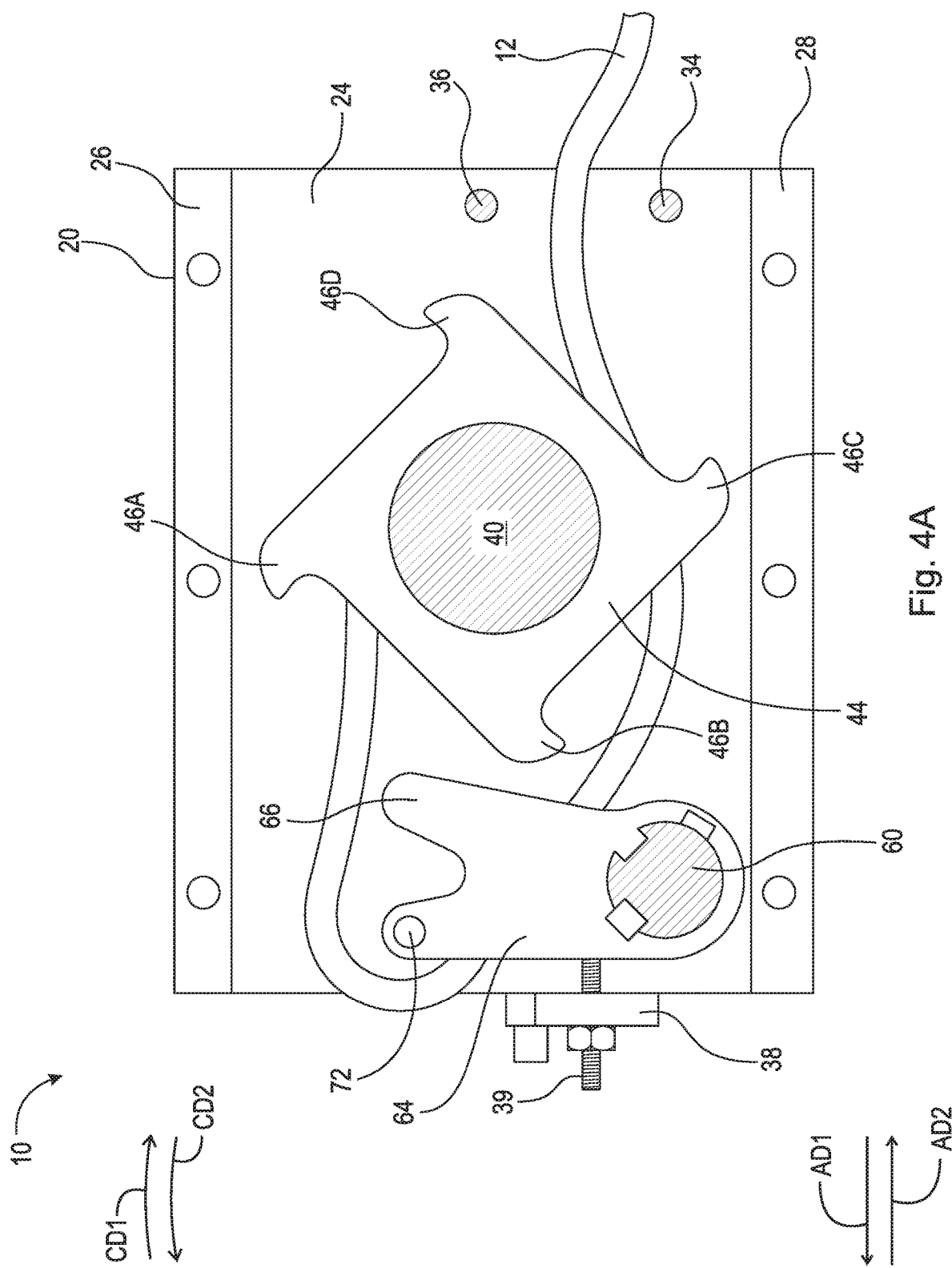
FIG. 4A is a cross-sectional view of the containment device, taken generally along line 4-4 in FIG. 1.
Figure 4B:
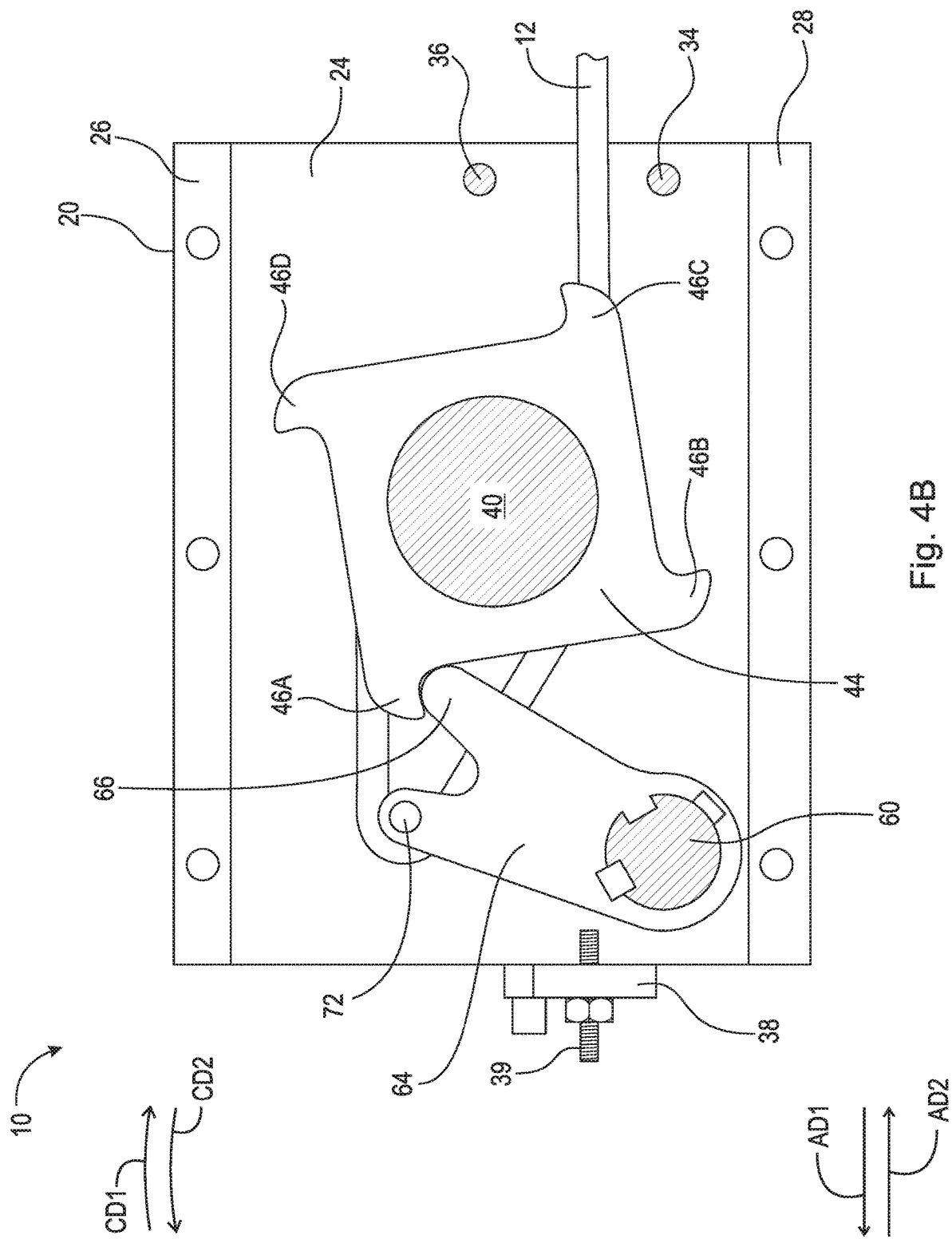
FIG. 4B is a cross-sectional view of the containment device, taken generally along line 4-4 in FIG. 1, in an engaged state; and, FIG. 5 is a perspective view of the containment device shown in FIG. 1 arranged on a tow truck.

Adverting now to the figures, FIG. 1 is a front perspective view of containment device 10, in a disengaged state. FIG. 2 is a rear perspective view of containment device 10. FIG. 3A is a side elevational view of containment device 10. FIG. 3B is a side elevational view of containment device 10, in an engaged state. FIG. 4A is a cross-sectional view of containment device 10, taken generally along line 4-4 in FIG. 1. FIG. 4B is a cross-sectional view of containment device 10, taken generally along line 4-4 in FIG. 1, in an engaged state. Containment device 10 generally comprises housing 20, axle 40, axle 60, tensioner 80, and tensioner 100. The following description should be read in view of FIGS. 1-4B.

Housing 20 comprises plates 22, 24, 26, and 28. Top plate 26 and bottom plate 28 connect side plate 22 to side plate 24. Side plate 22 comprises hole 30 and hole 32 which engage axles 40 and 60, as will be described in greater detail below. In some embodiments, hole 30 and/or hole 32 comprises a bearing. Additionally, side plate 24 may comprise corresponding holes for axles 40 and 60 (not shown). Housing may further comprise guide rails 34 and 36. Guide rails 34 and 36 are operatively arranged at the front of housing 20 to ensure line 12 does not get tangled or caught. Housing 20 may further comprise plates (e.g., sheet metal) to cover the openings in the front and rear to make housing 20 waterproof and to protect the internal components of containment device 10, while leaving an opening proximate guide rails 34 and 36 for line 12 to pass through.

Axle 40 is rotatably connected to plates 22 and 24. As shown, axle 40 comprises portion 42 that rotatably engages and extends through plate 22 via hole 30. Axle 40 may rotatably engage a corresponding hole in plate 24 in a like fashion. Axle 40 comprises gear 44 and gear 48. Gear 44 is non-rotatably connected to axle 40 and comprises a plurality of teeth, for example, tooth 46A, tooth 46B, tooth 46C, and tooth 46D. Gear 48 is non-rotatably connected to axle 40 and comprises a plurality of teeth, for example, tooth 50A (not shown), tooth 50B, tooth 50C (not shown), and tooth 50D. Gear 44 and gear 48 may be connected to axle 40 via any suitable means, for example, solder, welding, adhesives, bolts, screws, rivets, teeth, keys, interference fit, etc. Line 12 is fixedly secured to axle 40 at one end, such that as axle 40 rotates, it winds or unwinds line 12. It should be appreciated that line 12 may comprise any suitable material for safely securing and containing a vehicle or falling object, for example, cable, synthetic cable, chain, rope, cord, etc.

Axle 60 is rotatably connected to plates 22 and 24. As shown, axle 60 comprises portion 62 that rotatably engages and extends through plate 22 via hole 32. Axle 60 may rotatably engage a corresponding hole in plate 24 in a like fashion. Axle 60 comprises pawl 64 and pawl 68. Pawl 64 is non-rotatably connected to axle 60 and comprises at least one tooth, for example, tooth 66. Pawl 68 is non-rotatably connected to axle 60 and comprises at least one tooth, for example, tooth 70. Pawl 64 and pawl 68 may be connected to axle 60 via any suitable means, for example, solder, welding, adhesives, bolts, screws, rivets, teeth, keys, interference fit, etc. Axle 60 further comprises pull bar 72. Bar 72 is connected to pawls 64 and 68. Line 12 wraps around bar 72 as shown. When enough force is applied to line 12, bar 72 is displaced in circumferential direction CD1 and teeth 66 and 70 of pawls 64 and 68 engage gears 44 and 48, respectively, as will be described in greater detail below. In some embodiments, bar 72 is rotatably connected to pawls 64 and 68. In some embodiments, bar 72 is non-rotatably connected to pawls 64 and 68.

Tensioner 80 comprises base 82, rod 84, spring 86, arm 90, and rod 92. Tensioner 80 is operatively arranged to bias axle 60 in circumferential direction CD2. Base 82 is fixedly secured to plate 22. Rod 84 is adjustably connected to base 82. In some embodiments, rod 84 is threadably connected to base 82, for example, via a threaded hole in base 82. Rod 84 is operatively arranged to be displaced in axial direction AD1 or axial direction AD2 to increase and decrease, respectively, tension on arm 90 and thus axle 60. Spring 86 engages rods 84 and 86 to provide tension or axial force on arm 90 and thus rotational force on axle 60. In some embodiments, spring 86 is a coil spring. Arm 90 is rotatably connected to axle 60, and specifically, portion 62 of axle 60. Portion 62 extends through hole 32 and protrudes from plate 22. Arm 90 may be connected to axle 60 via any suitable means, for example, solder, welding, adhesives, bolts, screws, rivets, teeth, keys, interference fit, etc. Rod 92 is connected to arm 90. In some embodiments, rod 92 is threadably connected to arm 90, for example, via a threaded hole in arm 90. In some embodiments, rod 92 is fixedly secured to arm 90. Rod 92 may be connected to arm 90 via any suitable means, for example, solder, welding, adhesives, bolts, screws, rivets, teeth, keys, interference fit, etc.

Tensioner 100 comprises rod 102, spool 104, and spring 106. Rod 102 is connected to housing 20, for example, plate 22. In some embodiments, rod 102 is fixedly secured to plate 22. Spool 104 is rotatably connected to rod 102. Spring 106 is connected to spool 104 and to portion 42 of axle 40. In some embodiments, spring 106 comprises a constant force spring and is connected to spool 104 at a first end and portion 42 at a second end. As is known in the art, a constant force spring is a spring for which the force it exerts over its range of motion is generally constant. Generally constant-force springs are constructed as a rolled ribbon of spring steel such that the spring is in a rolled up form when relaxed. The approximation of "constant force" comes from a long travel and a pre-loaded rest position, so that the initial force does not start from zero but a finite value. For relatively small variations around this initial position the force is approximately constant. Thus, as is known in the art, spring 106 may be coiled around spool 104 and connected to portion 42, such that as axle 40 is displaced in circumferential direction CD2, spring 106 applies a rotational force thereto in circumferential direction CD1. This has the effect of automatic rewind. Specifically, line 12 may be extended or pulled out from containment device 10 when sufficient force has been applied in axial direction AD2 (axle 40 is displaced in circumferential direction CD1). Once the force is released, line 12 is biased by tensioner 100 and automatically rewinds in axial direction AD1 onto axle 40 (axle 40 is displaced in circumferential direction CD2).

In some embodiments, containment device 10 further comprises stopper 38. As shown, stopper 38 is connected to the rear of containment device 10, for example plate 22, and is operatively arranged to limit the circumferential displacement of pawl 64 and/or 68, and thus axle 60. Tensioner 80 applies tension to axle 60 in circumferential direction CD2. Stopper 38 prevents pawls 64 and 68 from displacing in circumferential direction CD2 and maintains the proximal position of teeth 66 and 70 relative to gears 44 and 48, respectively. Stopper 38 may further comprise rod 39. Rod 39 is operatively arranged to engage pawl 64 and/or pawl 68 to prevent displacement in circumferential direction CD2. Rod 39 is adjustably connected to stopper 38. In some embodiments, rod 39 is threadably connected to stopper 38, for example, via a threaded hole in stopper 38. Rod 39 is operatively arranged to be displaced in axial direction AD1 or axial direction AD2 to decrease and increase, respectively, the proximity of teeth 66 and 70 to gears 44 and 48, respectively.

It should be appreciated that in some embodiments, containment device 10 may comprise a mirrored arrangement proximate plate 24. For example, containment device 10 may comprise a second tensioner connected to axle 40 and a second tensioner connected to axle 60 with respect to plate 24.

Containment device 10 is shown in FIGS. 3A and 4A in a disengaged or loosened state. In the disengaged state, pawl 64 is disengaged from gear 44 and pawl 68 is disengaged from gear 48 (not shown). Specifically, tooth 66 is disengaged from all of teeth 46A-D and tooth 70 is disengaged from teeth 50A-D (not shown). In some embodiments, stopper 38, specifically, rod 39, abuts against pawl 64 to prevent displacement of pawl 64 in circumferential direction CD2. As previously described, this maintains tooth 66 in close proximity to teeth 46A-D and tooth 70 in close proximity to teeth 50A-D (not shown). Spring 86 of tensioner 80 applies force to arm 90 generally in axial direction AD1 to maintain disengagement of teeth 66 and 70 from gears 44 and 48, respectively. Also shown in line 12 wrapped around bar 72.

Containment device 10 is shown in FIGS. 3B and 4B in an engaged or tightened state. When enough force is applied to line 12 in axial direction AD2 (e.g., when the main winch on a tow truck breaks and the broken down vehicle begins to fall down off the inclined bed), such abrupt force causes line 12 to tighten about bar 72 thereby "pulling" it. Such tightening or pulling causes pawls 68 and 68 to displace in circumferential direction CD1. Specifically, the force applied by line 12 to bar 72 must be great enough to overcome the force applied by tensioner 80, specifically spring 86, to axle 60 in circumferential direction CD2. When the "engagement force" is applied to line 12, pawls 64 and 68 displace in circumferential direction CD1 and, at the same time, axle 40 and thus gears 44 and 48 displace in circumferential direction CD2. Such motions cause engagement between tooth 66 and one of teeth 46A-D and tooth 70 and one of teeth 50A-D (not shown). When the engagement force is removed from line 12, tensioner 80 displaces arm 90 in circumferential direction CD2, which disengages pawls 64 and 68 from gears 44 and 48, respectively.

Figure 5:
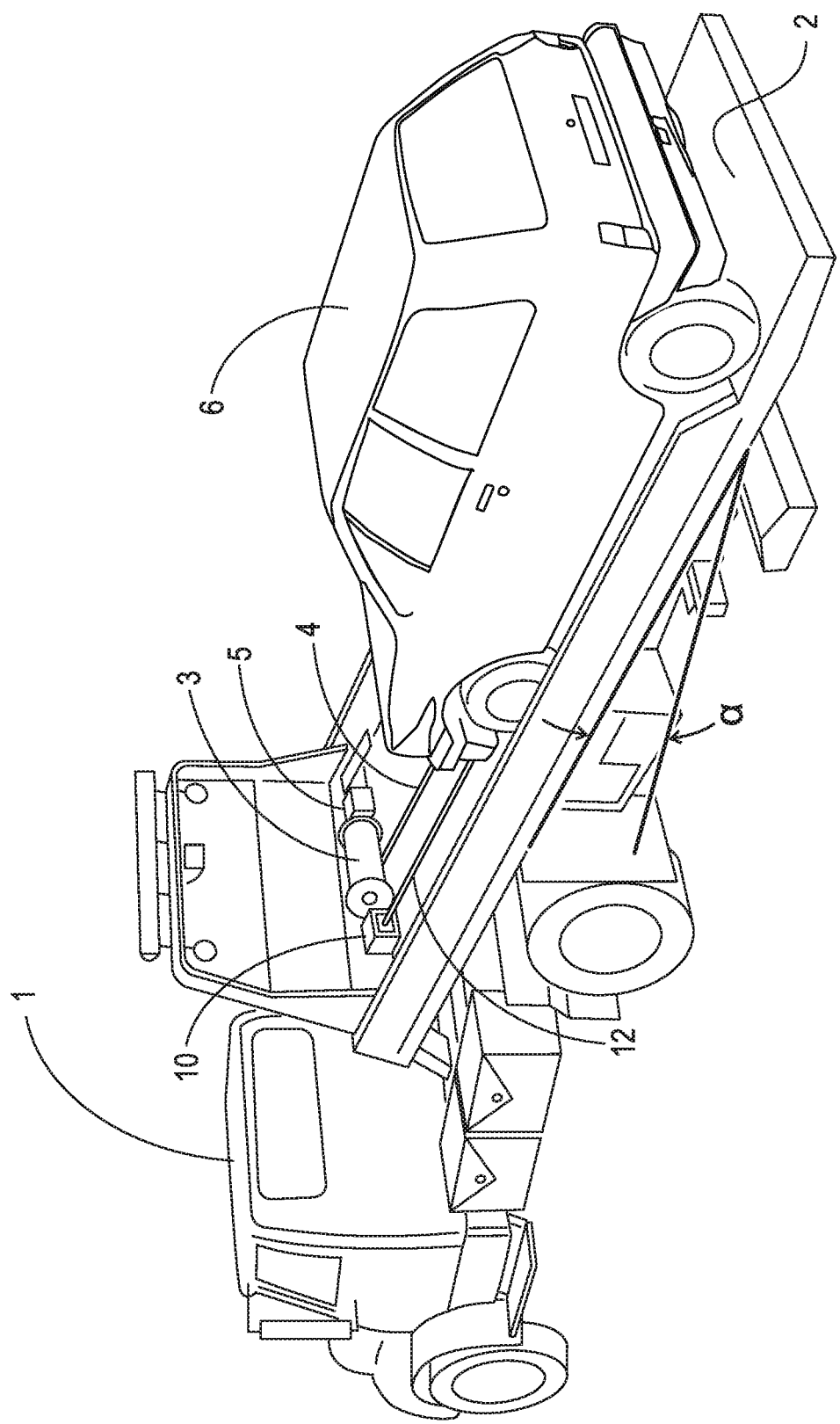

FIG. 5 is a perspective view of containment device 10 arranged on tow truck 1. Tow truck 1 generally comprises bed 2, main winch 3, which may for example be connected to motor 5, and containment device 10. Winch 3 comprises line 4 and containment device 10 comprises line 12, as previously described. To load vehicle 6 onto tow truck 1, bed 2 is inclined and arranged at angle α. Main line 4 of main winch 3 is connected to vehicle 6 at a first tow location on vehicle 6. Line 4 of secondary containment device 10 is connected to vehicle 6 at a second location on vehicle 6. As winch 3 pulls vehicle 6 up inclined bed 2, any slack in line 12 is removed via tensioner 100, specifically spring 106 (i.e., the "automatic rewind" effect as described above). In the event that a failure occurs in winch 3 or line 4, or at the connection location of line 4 to vehicle 6, vehicle 6 will suddenly begin to roll backwards down inclined bed 2. The force applied on line 12 by falling vehicle 6 provides the "engagement force." As such, line 12 pulls on bar 72 which rotates pawls 64 and 68 in circumferential direction CD1 and, at the same time, line 12 rotates axle 40 in circumferential direction CD2. This results in teeth 66 and 70 engaging the teeth of gears 44 and 48, respectively, which locks up line 12 and thus prevents vehicle 6 from further falling down inclined bed 2. Once vehicle 6 is stabilized, a new line, from winch 3 for example, may be connected to vehicle 6 to again pull vehicle 6 up inclined bed 2. This releases the engagement force from line 12 and disengages pawls 64 and 68 from gears 44 and 48, respectively, and re-enables tensioner 100 for automatic rewind of axle 40.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

1 Tow truck
2 Bed
3 Winch
4 Line
4 Motor
5 Vehicle
6 Containment device
12 Line
20 Housing
22 Plate
24 Plate
26 Plate
28 Plate
30 Hole
32 Hole
34 Rail
36 Rail
38 Stopper
39 Rod
40 Axle
42 Portion
44 Gear
46A Tooth
46B Tooth
46C Tooth
46D Tooth
48 Gear
50A Tooth (not shown)
50B Tooth
50C Tooth (not shown)
50D Tooth
60 Axle
62 Portion
64 Pawl
66 Tooth
68 Pawl
70 Tooth
72 Bar
80 Tensioner
82 Base
84 Rod
86 Spring
90 Arm
92 Rod
100 Tensioner
102 Rod
104 Spool
106 Spring
α Angle
AD1 Axial direction
AD2 Axial direction
CD1 Circumferential direction
CD2 Circumferential direction

What is claimed is:

1. A containment device, comprising:
   a housing;
   a first axle rotatably connected to the housing, the first axle including at least one gear having a plurality of teeth;
   a second axle rotatably connected to the housing, the second axle including at least one pawl operatively arranged to engage the plurality of teeth; and,
   a line connected to the first axle and engaged with the second axle.

2. The containment device as recited in claim 1, wherein:
   in a disengaged state, the at least one pawl is not engaged with the plurality of teeth; and,
   in an engaged state, the at least one pawl is engaged with at least one of the plurality of teeth.

3. The containment device as recited in claim 1, further comprising a first tensioner connected to the first axle, the first tensioner biasing the first axle in a first circumferential direction.

4. The containment device as recited in claim 3, wherein the first tensioner comprises:
   a spool rotatably connected to the housing; and,
   a spring connected to the spool and the first axle.

5. The containment device as recited in claim 4, wherein the spring is a constant force spring.

6. The containment device as recited in claim 1, further comprising a second tensioner connected to the second axle, the second tensioner biasing the second axle in a second circumferential direction.

7. The containment device as recited in claim 6, wherein the second tensioner comprises:
   an arm non-rotatably connected to the second axle; and,
   a spring connected to the arm and the housing.

8. The containment device as recited in claim 7, wherein the second tensioner further comprises a rod connecting the spring and the housing, the rod operatively arranged to adjust the biasing force on the second axle.

9. The containment device as recited in claim 1, wherein the second axle further comprises a bar, the line operatively arranged to engage the bar and displace the at least one pawl in a first circumferential direction.

10. The containment device as recited in claim 1, wherein the at least one pawl comprise at least one tooth operatively arranged to engage the plurality of teeth.

11. The containment device as recited in claim 1, further comprising a stopper connected to the housing, the stopper operatively arranged to:
    engage the at least one pawl; and,
    prevent displacement of the at least one pawl in a first circumferential direction.

12. A containment device, comprising:
    a housing;
    a first axle rotatably connected to the housing, the first axle including at least one gear having a plurality of teeth;
    a second axle rotatably connected to the housing, the second axle including at least one pawl operatively arranged to engage the plurality of teeth;
    a first tensioner connected to the second axle, the first tensioner biasing the second axle in a first circumferential direction; and,
    a line connected to the first axle and engaged with the second axle.

13. The containment device as recited in claim 12, wherein:
    in a disengaged state, the at least one pawl is not engaged with the plurality of teeth; and,
    in an engaged state, the at least one pawl is engaged with at least one of the plurality of teeth preventing the first axle from displacing in the first circumferential direction.

14. The containment device as recited in claim 12, wherein the first tensioner comprises:
    an arm non-rotatably connected to the second axle; and,
    a spring connected to the arm and the housing.

15. The containment device as recited in claim 14, wherein the first tensioner further comprises a rod connecting the spring and the housing, the rod operatively arranged to adjust the biasing force on the second axle.

16. The containment device as recited in claim 12, further comprising a second tensioner connected to the first axle, the second tensioner biasing the first axle in a second circumferential direction, opposite the first circumferential direction.

17. The containment device as recited in claim 16, wherein the second tensioner comprises a spring connected to the housing and the first axle.

18. The containment device as recited in claim 17, wherein the spring is a constant force spring.

19. The containment device as recited in claim 12, wherein the second axle further comprises a bar, the line operatively arranged to engage the bar and displace the at least one pawl in a second circumferential direction, opposite the first circumferential direction.

20. A containment device, comprising:
    a housing;
    a first axle rotatably connected to the housing, the first axle including at least one gear;
    a second axle rotatably connected to the housing, the second axle including at least one pawl operatively arranged to engage the at least one gear;
    a first tensioner connected to the first axle, the first tensioner biasing the first axle in a first circumferential direction;
    a second tensioner connected to the second axle, the second tensioner biasing the second axle in a second circumferential direction, opposite the first circumferential direction; and,
    a line connected to the first axle and engaged with the second axle;
    wherein when an engagement force is applied to the line, the at least one pawl:
        displaces in the first circumferential direction;
        engages the at least one gear; and,
        prevents displacement of the first axle in the second circumferential direction.

* * * * *